M. A. JOHNSON.
PITMAN PROTECTOR FOR HARVESTING MACHINES.
APPLICATION FILED MAY 5, 1919.

1,335,897. Patented Apr. 6, 1920.

INVENTOR:
M. A. Johnson
BY his ATTORNEY:
A. M. Carlsen

UNITED STATES PATENT OFFICE.

MELVIN A. JOHNSON, OF TENSTRIKE, MINNESOTA.

PITMAN-PROTECTOR FOR HARVESTING-MACHINES.

1,335,897.      Specification of Letters Patent.      Patented Apr. 6, 1920.

Application filed May 5, 1919. Serial No. 295,013.

*To all whom it may concern:*

Be it known that I, MELVIN A. JOHNSON, a citizen of the United States, residing at Tenstrike, in the county of Beltrami and State of Minnesota, have invented a new and useful Pitman-Protector for Harvesting-Machines, of which the following is a specification.

My invention relates to improvements in harvesting machines of the kinds having a sickle-bar operated by a pitman, like mowers, reapers and self-binders. The main object of the invention is to provide such machine with an efficient guard to protect the pitman from getting broken, the way it frequently happens in ordinary harvesters, by either driving the machine forward with the pitman against stumps, stones and other obstructions, or by letting the pitman in its vibratory movement break over the top of such obstructions.

In the accompanying drawing,—

Figure 1:
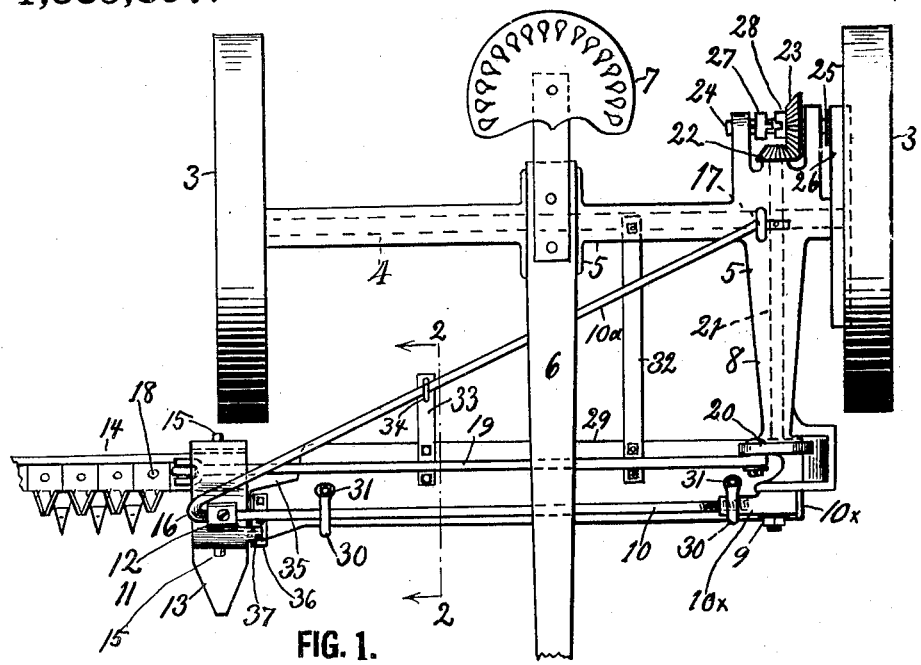
Figure 2:
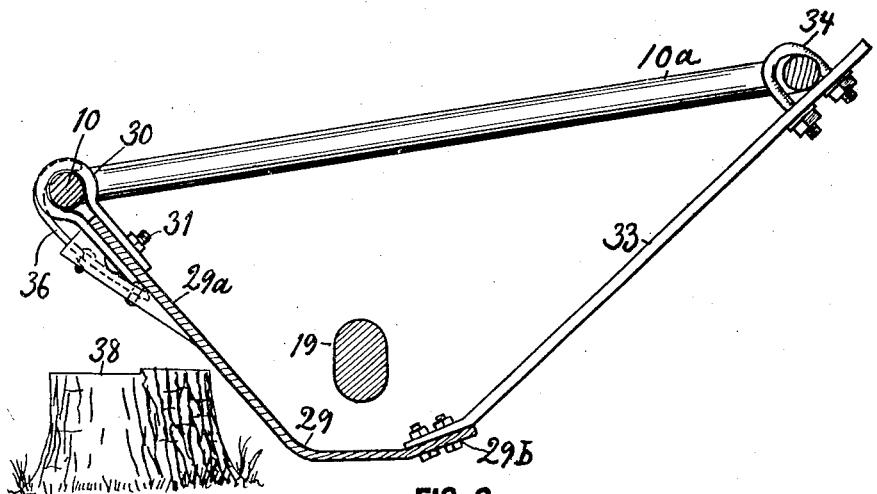

Figure 1 is a partly completed top view of a mower equipped with my pitman protector. Fig. 2 is a section on the line 2—2 in Fig. 1.

Referring to the drawing by reference numerals, 3 designates the ground wheels, 4 the axle, 5 the main frame, 6 the pole and 7 the seat of an ordinary mowing machine, some parts of which are omitted in the drawing because they do not involve my invention.

The usual forwardly extending arm 8 of the frame 5 has its extreme front end pivotally secured at 9 to a transverse frame bar 10, which is screwed into the part 10$^x$. Upon the other end of the bar is secured at 11 the usual upwardly arched portion 12 of the shoe 13, in which the finger bar 14 is pivoted at 15. The bar 10 is bent at 16 to form a diagonal frame bar, 10$^a$, whose rearward end is secured at 17 underneath the main frame 5.

The sickle-bar 18 is connected by a pitman 19 to a crank wheel 20, whose shaft 21 is journaled in the arm 8 and frame 5 and provided with a bevel pinion 22, which is driven by a bevel gear 23, loosely fitted on a short shaft 24, on whose outer end is fixed a pinion 25, which is driven by an internal gear 26, fixed on the axle 4, the latter being rotated by ratchet wheels and dogs concealed in the hubs of the ground wheels, as usual in such machines. 27 is a clutch member slidably keyed on the short shaft 24 and adapted to engage clutch teeth 28 on the gear 23 when the latter is to run the crank shaft and the pitman. The member 27 is shifted by a lever (not shown).

The pitman protector comprises a strong strip 29 of sheet metal forming a kind of angle iron or channel along the under side and front side of the pitman. Said protector strip or plate is held in place between the ground and the pitman by clevises 30 taken over the bar 10 and secured by bolts 31 to the inclined front portion 29$^a$ of the protector. The rear portion or 29$^b$ is secured to the frame by rearwardly and upwardly extending braces 32 and 33; the latter brace is preferably secured to the bar 10$^a$ by a clip or U-bolt 34.

In Fig. 1 35 shows a clearance in the base of the protector for the lower end of the pitman. Near said clearance the front corner of the guard has an upstanding finger, 36, engaging either the front side of the bar 10, as in Fig. 2, or it may bear against the front side of a projection 37 of the frame portion known as the shoe, 13, according as the structure of the machine may vary.

In Fig. 2 it will be easiest understood that when the machine is in operation and is moving forward and a stump, as 38, or other obstruction concealed in the grass or grain is encountered, the pitman will get broken either by being forced against the side of the obstruction or by being vibrated downward upon the top of it under the rapid action of the crank 20; but when protected by my device the inclined portion 29$^a$ of the same will act as a broad runner and by gliding over the obstruction will lift the machine with the pitman safely over and past the obstruction and then let it down again. The guard is also slightly curved upward at its rear edge, as at 29$^b$ in Fig. 2, so as to slide over minor obstructions in case the machine be moved backward.

What I claim is:

1. In a harvesting machine, a main frame having a bar extending diagonally rearwardly from the shoe of the machine to a point of the frame near the main axle of the machine, and mounted in the frame, a transversely disposed cutter bar, a transversely arranged pitman, a crank operating the pitman, a guarding plate extending all along underneath said crank and pitman, and rearwardly directed braces securing said guarding plate to said diagonal bar and to the main frame; said guarding plate having its front portion inclined upwardly.

2. The structure specified in claim 1, said guarding plate forming a channel along the greater portion of the pitman.

3. The structure specified in claim 1, said guarding plate having at one end a clearance for the lower end of the pitman.

4. The structure specified in claim 1, said guarding plate having also its rearward edge curved or inclined partly upward.

In testimony whereof I affix my signature.

MELVIN A. JOHNSON.